United States Patent
Lynas et al.

(10) Patent No.: US 8,396,613 B2
(45) Date of Patent: Mar. 12, 2013

(54) METHOD AND APPARATUS FOR PROVIDING POWER IN AN AIRCRAFT TO ONE OR MORE AIRCRAFT SYSTEMS

(75) Inventors: Christopher Lynas, Bristol (GB); Iain Morgan, Bristol (GB)

(73) Assignee: Airbus Operations Limited, Bristol (GB)

( * ) Notice: Subject to any disclaimer, the term of this patent is extended or adjusted under 35 U.S.C. 154(b) by 976 days.

(21) Appl. No.: 12/230,176

(22) Filed: Aug. 25, 2008

(65) Prior Publication Data

US 2009/0076668 A1    Mar. 19, 2009

(30) Foreign Application Priority Data

Sep. 14, 2007    (GB) .................................. 0717903.9

(51) Int. Cl.
*G01C 23/00*    (2006.01)
(52) U.S. Cl. ................. 701/3; 701/16; 244/100
(58) Field of Classification Search .................. 244/100; 701/3, 16
See application file for complete search history.

(56) References Cited

U.S. PATENT DOCUMENTS

| | | | |
|---|---|---|---|
| 4,243,892 A * | 1/1981 | Andersson et al. | 290/1 R |
| 5,767,663 A | 6/1998 | Lu | |
| 6,295,487 B1 * | 9/2001 | Ono et al. | 701/22 |
| 6,360,535 B1 * | 3/2002 | Fisher | 60/409 |
| 2005/0082427 A1 * | 4/2005 | Seung | 244/102 R |
| 2005/0224642 A1 | 10/2005 | Sullivan | |
| 2005/0253020 A1 | 11/2005 | McCoskey | |
| 2006/0038068 A1 * | 2/2006 | Sullivan | 244/111 |
| 2006/0293805 A1 * | 12/2006 | Garcia | 701/16 |

FOREIGN PATENT DOCUMENTS

GB    539405    4/1940

OTHER PUBLICATIONS

Great Britain Search Report for GB Application No. 0717903.9, dated Dec. 11, 2007.

* cited by examiner

*Primary Examiner* — Mary Cheung
*Assistant Examiner* — Truc M Do
(74) *Attorney, Agent, or Firm* — Nixon & Vanderhye P.C.

(57) ABSTRACT

A method and apparatus is disclosed in which an aircraft system such as the landing gear system or braking system is operated at least partially under power provided by a generator driven by the wheels of the landing gear.

10 Claims, 5 Drawing Sheets

METHOD AND APPARATUS FOR PROVIDING POWER IN AN AIRCRAFT TO ONE OR MORE AIRCRAFT SYSTEMS

This application claims priority to Great Britain Application No. 0717903.9, filed 14 Sep. 2007, the entire contents of each of which are hereby incorporated by reference.

FIELD OF INVENTION

The present invention relates to a method and apparatus for providing power in an aircraft to one or more aircraft systems.

BACKGROUND OF THE INVENTION

Aircraft are provided with aircraft-wide systems for distributing power under normal operating conditions. The power is distributed from a range of power sources to each location on the aircraft where the power is required. The power is generally in the form of hydraulic, pneumatic or electrical power and is generated from onboard generators powered independently or by the aircraft's engines.

However, one problem with such aircraft-wide systems is that the cable or pipe runs are vulnerable to damage and require rigorous inspection and maintenance. Furthermore, the greater the physical distance between a generator and the site where its power is used, the greater the power losses in the pipe or cable-work. Also, longer pipe or cable runs increase the weight of the aircraft. In order to provide sufficient redundancy, multiple power systems are provided, further adding to the weight and complexity of the aircraft systems. In order to provide their power, each generator also either directly or indirectly consumes aircraft fuel.

SUMMARY OF THE INVENTION

An embodiment of the invention provides apparatus for providing power in an aircraft to one or more aircraft systems, the apparatus comprising:

a generator associated with a set of landing gear for an aircraft, the generator being coupled to one or more wheels of the landing gear for extracting kinetic energy from the or each wheel and to convert the kinetic energy into a first power type for use by an aircraft system;

an aircraft system arranged to utilise the first power type; and a control system operable to controllably supply the first power type from the generator to the aircraft system.

The aircraft system may be the actuating system for the set of landing gear arranged to move the landing gear between a deployed position and a stowed position. The control system may be operable to supply the first power type to the actuating system for retraction of the landing gear to the stowed position after takeoff of the aircraft. The control system may comprise an energy storage device arranged to store surplus energy from the retraction of the landing gear for use in a subsequent movement of the landing gear to the deployed position. The landing gear actuating system may be arranged to partially deploy the landing gear by gravity freefall and the control system is arranged to extract gravitational potential energy from the freefall for supply to the generator for driving the wheels so as to store the gravitational potential energy for subsequent generation of power for powering the actuating system to complete the deployment of the landing gear.

The aircraft system may be the braking system for the aircraft. The braking system may be associated with the set of landing gear. The control system may be operable to supply the first power type to the braking system for operation of the braking system during landing of the aircraft. The control system may comprise an energy storage device arranged to be charged with energy from the generator for powering the braking system when the output of the generator is below a predetermined threshold.

The aircraft system may be powered by a second power type and the control system is operable to convert the first power type from the generator to the second power type. The first or second power type may be hydraulic, pneumatic or electric.

Another embodiment provides apparatus for providing power in an aircraft to one or more aircraft systems, the apparatus comprising:

a generator associated with a set of landing gear for an aircraft, the generator being coupled to one or more wheels of the landing gear for extracting kinetic energy from the or each wheel and to convert the kinetic energy into power for use by an aircraft system;

an actuating system for the set of landing gear arranged to move the landing gear between a deployed position and a stowed position, the actuating system being arranged to utilise the power; and a control system operable to controllably supply the power from the generator to the actuating system.

A further embodiment provides apparatus for providing power in an aircraft to one or more aircraft systems, the apparatus comprising:

a generator associated with a set of landing gear for an aircraft, the generator being coupled to one or more wheels of the landing gear for extracting kinetic energy from the or each wheel and to convert the kinetic energy into power for use by an aircraft system;

an aircraft braking system arranged to utilise the power for operating the brakes for the aircraft; and a control system operable to controllably supply the power from the generator to the aircraft system.

Another embodiment provides a method for providing power in an aircraft to one or more aircraft systems, the method comprising the steps of:

a) receiving a command to operate an aircraft system arranged to utilise a first power type;

b) directing power from a generator associated with a set of landing gear for an aircraft, the generator being coupled to one or more wheels of the landing gear for extracting kinetic energy from the or each wheel and to convert the kinetic energy into the first power type for use by an aircraft system; and c) operating the aircraft system under the power from the generator in response to the command.

A further embodiment provides a method for providing power in an aircraft to one or more aircraft systems, the method comprising the steps of:

a) receiving a command to operate an actuating system for the set of landing gear, the actuating system being arranged to move the landing gear between a deployed position and a stowed position;

b) receiving power from a generator associated with a set of landing gear for the aircraft, the generator being coupled to one or more wheels of the landing gear for extracting kinetic energy from the or each wheel and to convert the kinetic energy into power for an aircraft system; and c) providing the power to the actuating system in response to the command so as to operate the landing gear.

Another embodiment provides a method for providing power in an aircraft to one or more aircraft systems, the method comprising the steps of:

a) receiving a command to operate an aircraft braking system, the braking system being operable to operate the aircraft brakes;

b) receiving power from a generator associated with a set of landing gear for the aircraft, the generator being coupled to one or more wheels of the landing gear for extracting kinetic energy from the or each wheel and to convert the kinetic energy into power for an aircraft system; and c) providing the power to the aircraft braking system in response to the command so as to operate the aircraft brakes.

BRIEF DESCRIPTION OF THE DRAWINGS

Embodiments of the invention will now be described, by way of example only, with reference to the accompanying drawings in which.

DETAILED DESCRIPTION OF PREFERRED EMBODIMENTS OF THE INVENTION

Figure 1:
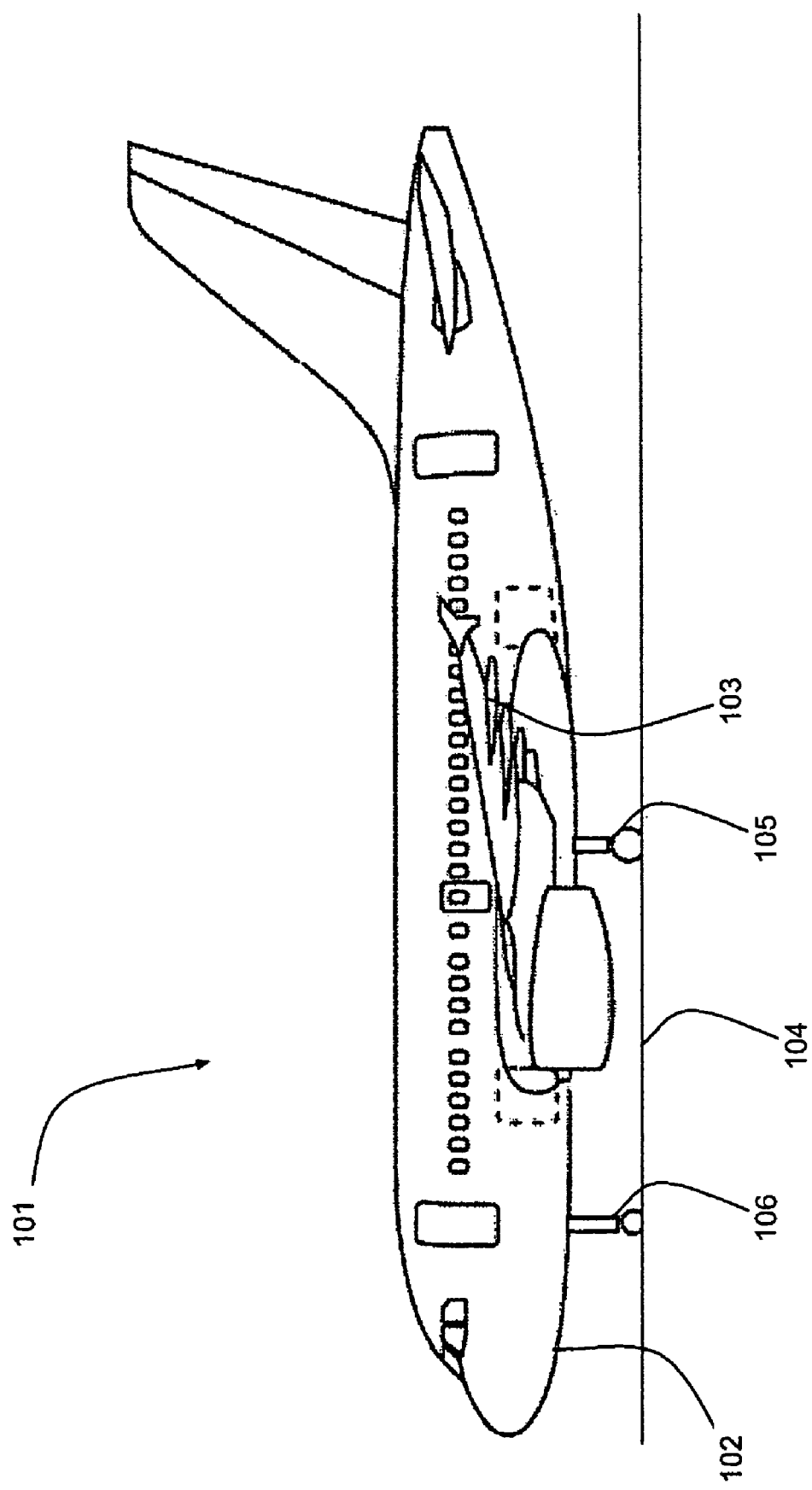
FIG. 1 is a side view of an aircraft.

With reference to FIG. 1, an aircraft 101 comprises a fuselage 102 and a set of wings 103 faired into the fuselage 102. The aircraft 101 is supported on the ground 104 by a set of landing gear or undercarriage in the form of main landing gear 105 and nose landing gear 106. The landing gear 105, 106 is arranged to be movable between a deployed position supporting the aircraft 101 on the ground 104 and a stowed position in a landing gear bay within the aircraft structure while the aircraft 101 is in flight. Also, in certain maintenance arrangements, the landing gear 105, 106 may be retracted while the aircraft 101 is on the ground but otherwise supported by jacks.

Figure 2:
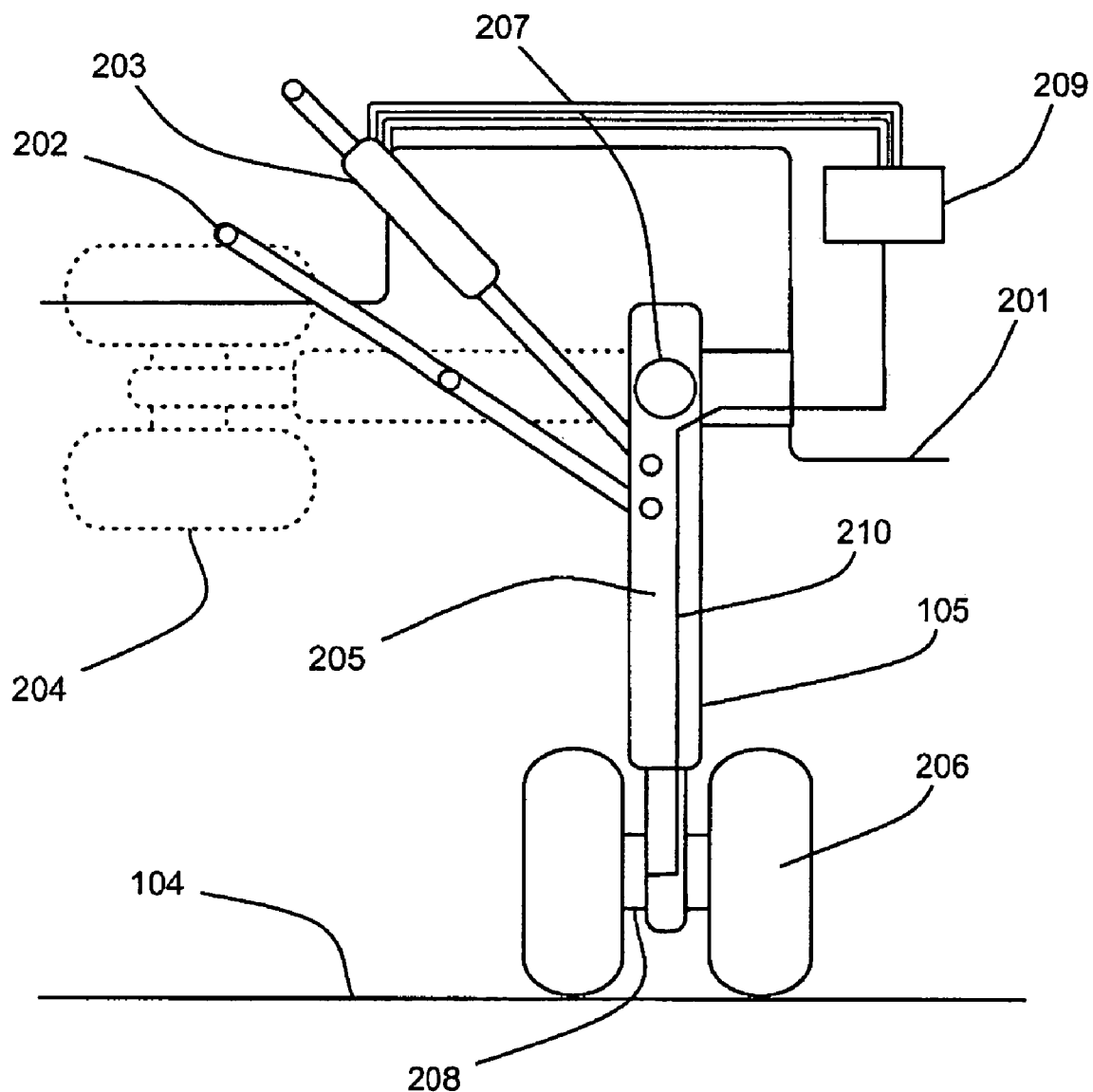
FIG. 2 is a partial sectional front view of one of the landing gear of the aircraft of FIG. 1.

FIG. 2 shows the deployed main landing gear 105 from the front in further detail. The landing gear is pivotally attached to the aircraft structure 201 and supported in the deployed position by a support strut 202. An actuator 203, in the form of a double acting cylinder, is attached between the aircraft structure 201 and the inboard end of the landing gear 105 to enable the controlled movement of the landing gear 105 between the deployed position and a stowed position 204 indicated in FIG. 2 by dotted lines. The landing gear 105 comprises a main strut 205, which forms the point of attachment at its inboard end for the actuator 203, and bears a pair of wheels 206 at its outboard end. The main strut 205 also provides the pivotable attachment between the landing gear 105 and the aircraft structure 201 via a pivot point 207. The landing gear 105 further comprises two stub axles 208 at the outboard end of the main strut 205 each of which form an attachment point for one of the wheels 206. A generator (shown in FIG. 3) is mounted within each of the stub axles 208 and is arranged to be driven by the associated wheel 206. The generator is connected to a control and actuating system 209 via a cable run 210 and is arranged to provide power to the control and actuating system 209 for the in-flight operation of the actuator 203 so as to move the landing gear 105 between its deployed and stowed positions.

Figure 3:
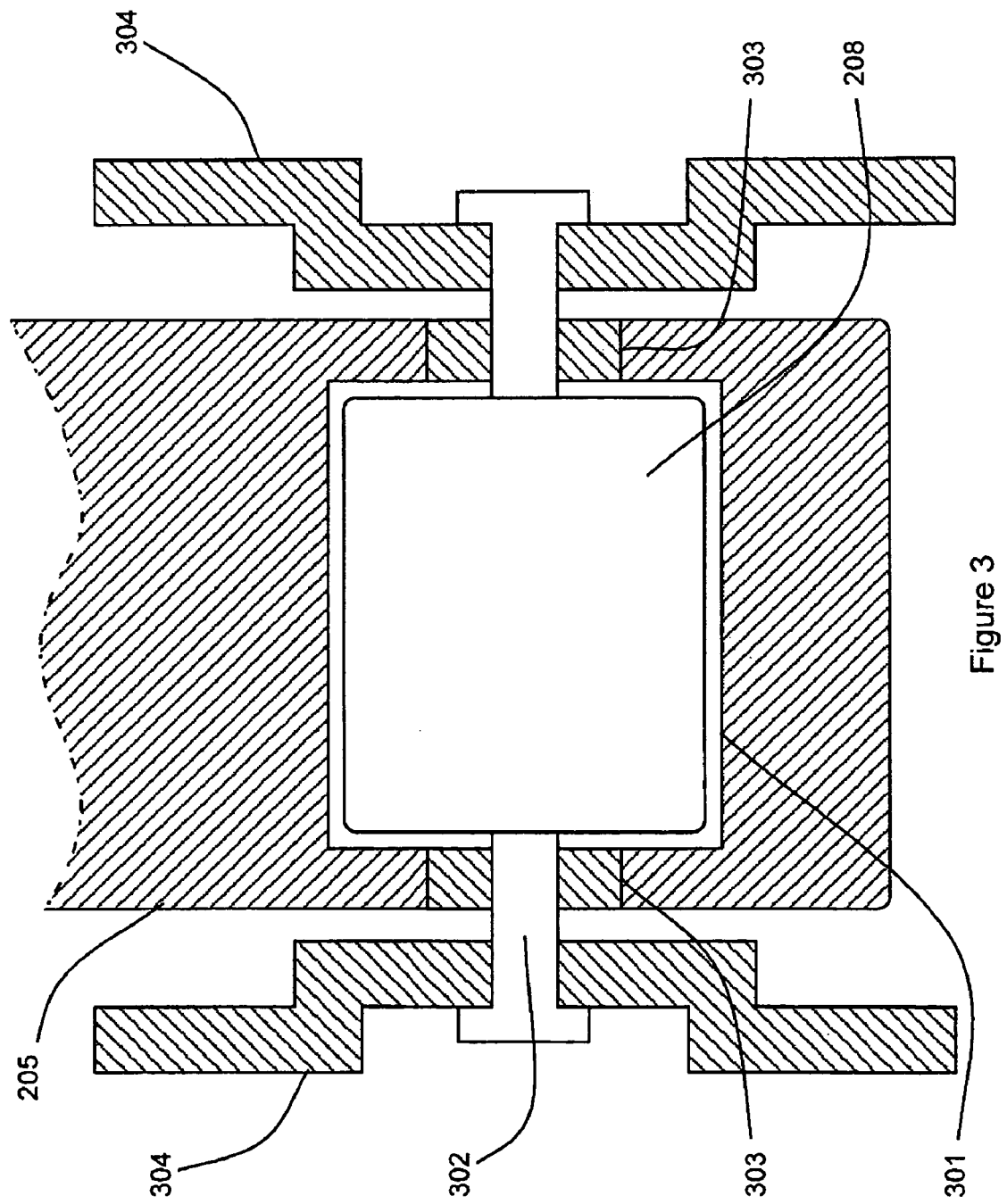
FIG. 3 is a partial sectional front view of part of the landing gear of FIG. 2.

With reference to FIG. 3, shows one of the generators 301 mounted within one of the stub axles 208 attached to the main strut 205 of the landing gear 105. As noted above, the stub axle 208 provides the attachment point for one of the wheels 206 via a bearing 302. The bearing 302 enables the wheel 206 to spin freely on the stub axle 208. The wheel also comprises a tyre 303. The generator 301 comprises a drive shaft 304 fixed to a link plate 305. The link plate 305 is also fixed to the wheel and arranged to enable the wheel 206 to drive the generator 301 via the drive shaft 304 so as to transfer the spinning kinetic energy of the wheel 206 to the generator 301.

Figure 4:
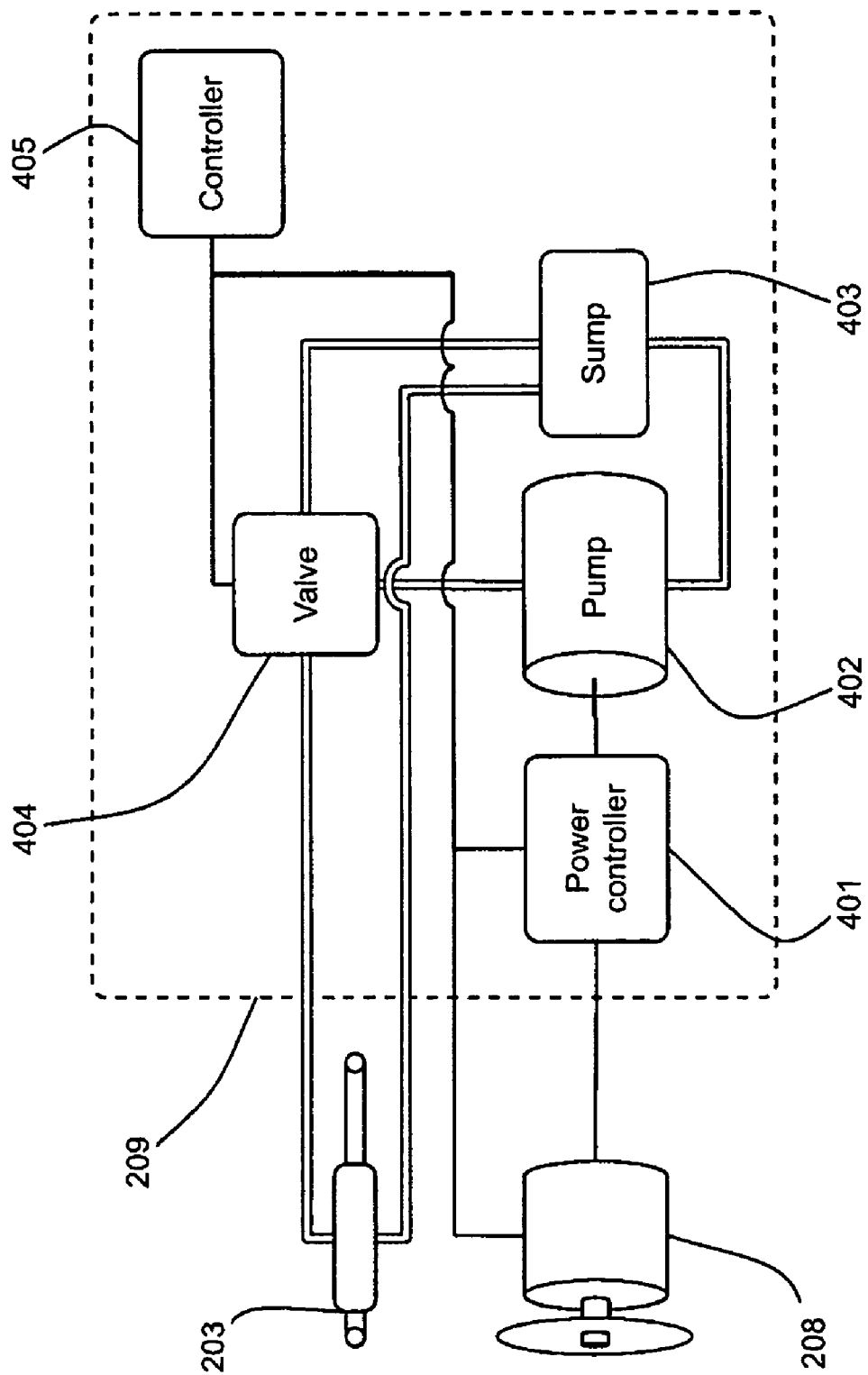
FIG. 4 is a schematic illustration of a control and actuating system for the landing gear of FIG. 2.

FIG. 4 shows the control and actuating system 209 in further detail. The generator 301 is connected, via a power controller 401, to a hydraulics system within the control and actuating system 209. The hydraulics system comprises a pump 402, which takes a feed from a hydraulic sump 403 and is connected to an electrically operated hydraulic valve 404. The valve 404 is also connected directly to the sump 403 and to the actuator 203. The generator 301, valve 404 and power controller 401 are each electrically connected to controller 405 to enable the transmission of control signals. The controller 405 is arranged to actuate the valve 404 using the electrical control signals so as to operate the actuator 203 and to vent hydraulic fluid from the actuator 203 to the sump 403. The controller 405 is further arranged to monitor the output from the generator 301 and to control the operation of the power controller 401 to control the switching of the power, supplied from the generator 301, to the pump 402 as and when hydraulic power is required in the hydraulics system.

In the present embodiment, the generator 301 is bidirectional in that it is arranged to both generate electrical power from the wheels 206 but also to perform as a motor if supplied with electrical power so as to power the wheels 206. Similarly, the pump 402 is bidirectional in that it is arranged to convert electrical power from the generator 301 to hydraulic power and visa versa. In other words, the pump 402 and generator 301 are arranged to act together in one of two modes under the control of the controller 405. In the first mode, the pump 402 and generator 301 are arranged to convert kinetic energy from the wheels into hydraulic energy at the pump. In the second mode, the pump 402 and generator 301 are arranged to convert hydraulic energy at the pump 402 into electrical energy at the generator 301 to drive the wheels 206 and store kinetic energy therein.

The controller 405 is arranged to operate the actuator 203 in response to commands received from cockpit control systems (not shown) to move the landing gear 105 between its deployed and stowed positions. The power required to retract the landing gear 105 is extracted from the spinning wheels 206. When the aircraft 101 takes off, the wheels 206 continue to spin because of their rotational kinetic energy. The deployment of the landing gear 105 comprises two phases. In a primary phase, the landing gear is released into hydraulically damped freefall. In this primary phase the landing gear is moved into a partially deployed position. In the final phase the landing gear 105 is moved into its fully deployed position. The energy produced in the damping of the freefall in the primary phase is stored for use in the final phase of deployment. The generated energy is stored by using the wheels 206 as a flywheel. In other words, the damping energy is used to drive the wheels 206 via the generator 301, which is utilised as a motor during the primary stage. The stored energy is then extracted via the generator 301 to provide hydraulic power to enable the actuator 203 to drive the landing gear 105 into the fully deployed position.

Figure 5:
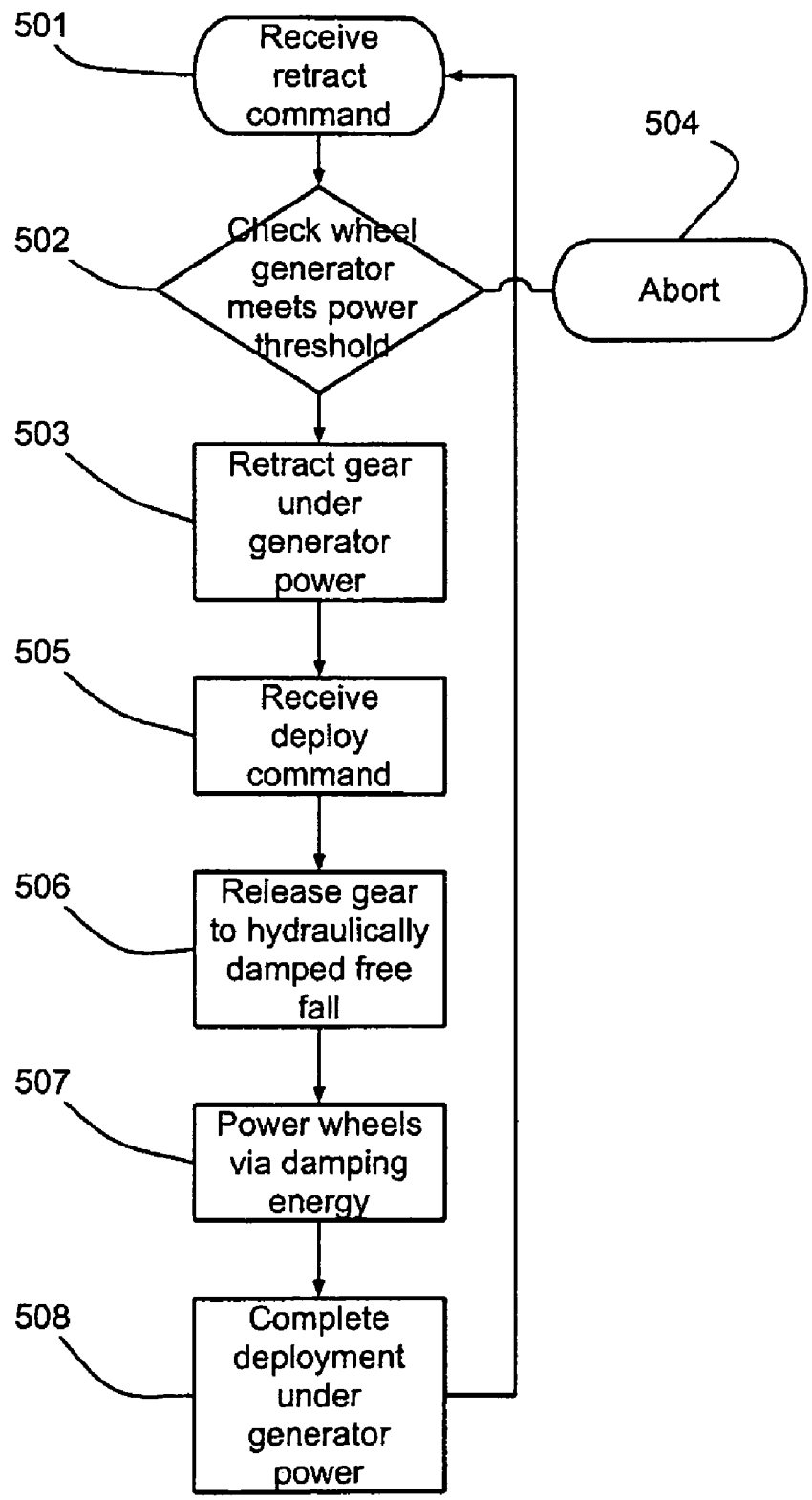
FIG. 5 is a flow chart illustrating the control process used in the control and actuating system of FIG. 3.

The processing performed by the controller 405 in response to landing gear deployment or retraction commands will now be described in further detail with reference to the flowchart of FIG. 5. At step 501, processing is initiated in response to a landing gear retraction command received by the controller 405 from the cockpit controls and processing moves to step 502. At step 502, the power available from the generator 301 is determined and if it exceeds a predetermined retraction energy threshold, processing moves to step 503. The retraction energy threshold determines the minimum power output from the generator 301 that is required to safely retract the landing gear 105 within operational limits. If, at step 502, the predetermined threshold is not met then processing aborts at step 504. In the present embodiment, if the processing is aborted, the aircraft is required either to return to the ground or to continue flying with its landing gear in the deployed position. At step 503, the controller 405 engages the generator 301 via the power controller 401 to power the pump 402. The controller 405 also operates the valve 404 to enable the pump 402 to drive the actuator 203 and fully retract the landing gear under the power extracted from the spinning wheels 206.

Processing then moves to step 505 to await the receipt of a landing gear deployment command. When such a command is received, processing moves to step 506 where the landing gear 105 is released into hydraulically damped freefall and thus partially deploys under the weight of gravity. Processing then moves to step 507, where the hydraulic damping provided by the controlled release of the hydraulic pressure from the actuator 203 is used to drive the pump 402 via the valve 404. The pump 402, in turn, powers the generator 301 as a motor to drive the wheels 206 and thus stores the gravitational potential energy released from the landing gear 105 in the primary phase of the deployment movement as kinetic energy in the wheels 206 acting as a flywheel. Processing then moves to step 508 where the stored damping energy is reclaimed from the wheels 206 via the generator 301 to power the pump 402 and thus the actuator 203 to perform the final stage of the landing gear movement into the fully deployed position. Once the landing gear 105 is in its fully deployed position, processing returns to step 501 to await a further landing gear retraction command as described above.

As will be understood by those skilled in the art, the valve described above enables multiple inputs to be simultaneously controlled so as to route each input to one or more outputs. Such valves may be provided by a single valve mechanism or by a set of individual valves either co-located or physically distributed. Also, in the above description of landing gear operation, the operation of other elements of the aircraft relating to the landing gear such as the operation of locks, bracing struts and landing gear bay doors is omitted for clarity. These elements are also substantially omitted from the figures. As will be understood by those skilled in the art, such ancillary operations may also be powered by the same mechanism as described in the embodiments of the invention.

In another embodiment, the generator provides hydraulic power directly thus making the power element of the control and actuating system 209 fully hydraulic. In a further embodiment, the landing gear operation system is wholly or partially electrically or pneumatically powered. In another embodiment, an additional energy input is provided to the control and actuating system 209 from the aircraft's electrical, pneumatic or hydraulic power systems, to enable operation when reduced power is available from the generator. As will be understood by those skilled in the art, the power type, that is electrical, pneumatic, hydraulic or any other suitable power type, may be converted between one type and one or more other types within any part of the control, actuating or aircraft system depending on a given application.

In a further embodiment, the pump or generator has a controllable power output, speed or direction thus reducing the need to have a power controller. For example, a gearing system may be provided between the drive shaft and the generator to allow the generator to spin at higher or lower speeds than that of the wheels. Such an arrangement may enable generators of differing power to be used. Different gearing may be provided for generating power from the wheels and for powering the wheels.

In another embodiment, the control provided by the control system 209 may be provided manually via cockpit or other controls either as a replacement for automatic control or as an override arrangement. In a further embodiment, the control and actuating system 209 comprises a hydraulic accumulator for storing excess kinetic energy from the wheels once the landing gear has been retracted. This excess energy stored in the generator may then by used to power the final stage of the deployment movement of the landing gear. In this embodiment, the pump and generator need not be bidirectional. Also, the hydraulic damping during the primary stage of the deployment movement may be provided by the venting of the actuator to the sump.

In another embodiment, a single generator is connected to both wheels via a common drive shaft. The drive shaft or generator may be provided with a differential to enable each wheel to turn independently of the other. As will be understood by those skilled in the art, many arrangements of generators and wheels may be provided with one generator being driven by a set of wheels, one generator per wheel or a sub set of the wheels driving one or more generators. The generators and wheels may be cross-linked to provide redundancy.

In a further embodiment, a ratchet connection is provided between the wheels and the generator so that in cases where the wheels are driven non-symmetrically only one of the wheels will drive the pump. In another embodiment, the generator is arranged in two parts, each part being driven by a different wheel. The first part of the generator is in the form of a set of magnets and the second part is in the form of a set of windings. One wheel drives the first part of the generator in one direction and the other wheel drives the second part of the generator, via a gearing system, in the opposite direction. This has the effect of reducing the need for a differential gear in the drive shaft and for enabling desired gearing to be simply introduced.

As will be understood by those skilled in the art, the hydraulic, pneumatic or electrically powered systems described above may form part of the global aircraft power systems or may be local substantially self-contained systems.

As will be understood by those skilled in the art, while the embodiments above illustrate the application of the invention to main landing gear and to side retracting gear, the invention is also applicable to other powered mechanisms for retracting gear and to other types of landing gear such as nose landing gear. Furthermore, the wheel systems used for the landing gear described herein may be any suitable arrangement, such as the diabolo or two wheel landing gear having a common axle as shown in FIG. 2, single wheel arrangements, bogey arrangements or any combination thereof. Where the landing gear is fitted with one or more skids for landing on alternative landing surfaces, one or more wheels may still be provided and arranged to maintain contact with the landing surface during take off. Thus energy can still be stored for providing power to the control and actuating system 209 for powering the retraction of the landing gear.

In another embodiment, the power extracted by the generator from the spinning of the wheels is supplied for use by another aircraft system in the form of the braking system for the aircraft. The braking system may be associated with the same landing gear as the or each generator. The kinetic energy generated in the wheels on landing is used to power the braking system during the landing procedure. In a further embodiment, an energy storage device such as a hydraulic accumulator is used to store surplus energy extracted by the generator to provide a store of power for the braking system. The power in the accumulator may be used to supplement the power from the generator during periods of high demand or used when the generator output below a predetermined threshold, for example, when the aircraft is stationary. The power from the generator may be provided exclusively for a given aircraft system, such as the landing gear system or the braking system, or may be provided for more than one such system at a time. For example, the power generated after takeoff may be used for retracting the landing gear while the power generated on landing may be used to power the braking system.

It will be understood by those skilled in the art, the control system that controllably supplies the power from the generator to a given aircraft system may be part of the generator system or part of the relevant aircraft system or a separate system.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

The invention claimed is:

1. Apparatus for providing power in an aircraft to one or more aircraft systems, said apparatus comprising:
   an actuating system configured to move a landing gear of said aircraft between a deployed position and a stowed position;
   a generator associated with said landing gear, said generator coupled to one or more wheels of said landing gear and configured to extract kinetic energy from said one or more wheels after take-off of said aircraft and to convert said kinetic energy into a first power type for use by said actuating system; and
   a control system configured to controllably supply said first power type from said generator to said actuating system for retraction of said landing gear to said stowed position after take-off of said aircraft.

2. Apparatus according to claim 1 in which said control system comprises an energy storage device arranged to store surplus energy from the retraction of said landing gear for use in a subsequent movement of said landing gear to said deployed position.

3. Apparatus according to any of claim 1, in which said landing gear actuating system is arranged to partially deploy said landing gear by gravity freefall and said control system is arranged to extract gravitational potential energy from said freefall for supply to said generator for driving said wheels so as to store said gravitational potential energy for subsequent generation of power for powering said actuating system to complete said deployment of said landing gear.

4. Apparatus according to claim 1, in which said aircraft system is powered by a second type of power and said control system is configured to convert said first type of power from said generator to said second type of power.

5. Apparatus according to claim 4 in which said first type of power or said second type of power is hydraulic, pneumatic or electric.

6. A method for providing power in an aircraft to one or more aircraft systems, said method comprising the steps of:
   a) receiving a command to operate an aircraft actuating system to move a landing gear of said aircraft between a deployed position to a stowed position;
   b) directing power from a generator associated with said landing gear, said generator coupled to one or more wheels of said landing gear and configured to extract kinetic energy from said one or more wheels after take-off of said aircraft and to convert said kinetic energy into said first power type for use by said actuating system; and
   c) operating said actuating system with said power from said generator in response to said command so as to stow said landing gear using said first power type generated after take-off of said aircraft.

7. A method according to claim 6 in which an energy storage device is arranged to store surplus energy from the retraction of said landing gear for use in a subsequent movement of said landing gear to said deployed position.

8. A method according to claim 6, in which said landing gear actuating system is arranged to partially deploy said landing gear by gravity freefall and gravitational potential energy is extracted from said freefall for supply to said generator for driving said wheels so as to store said gravitational potential energy for subsequent generation of power for powering said actuating system to complete said deployment of said landing gear.

9. A method according to claim 6, in which said aircraft system is powered by a second type of power and said first type of power from said generator is converted to said second type of power.

10. A method according to claim 9 in which said first type of power or said second type of power is hydraulic, pneumatic or electric.

* * * * *